United States Patent Office 3,182,396
Patented May 11, 1965

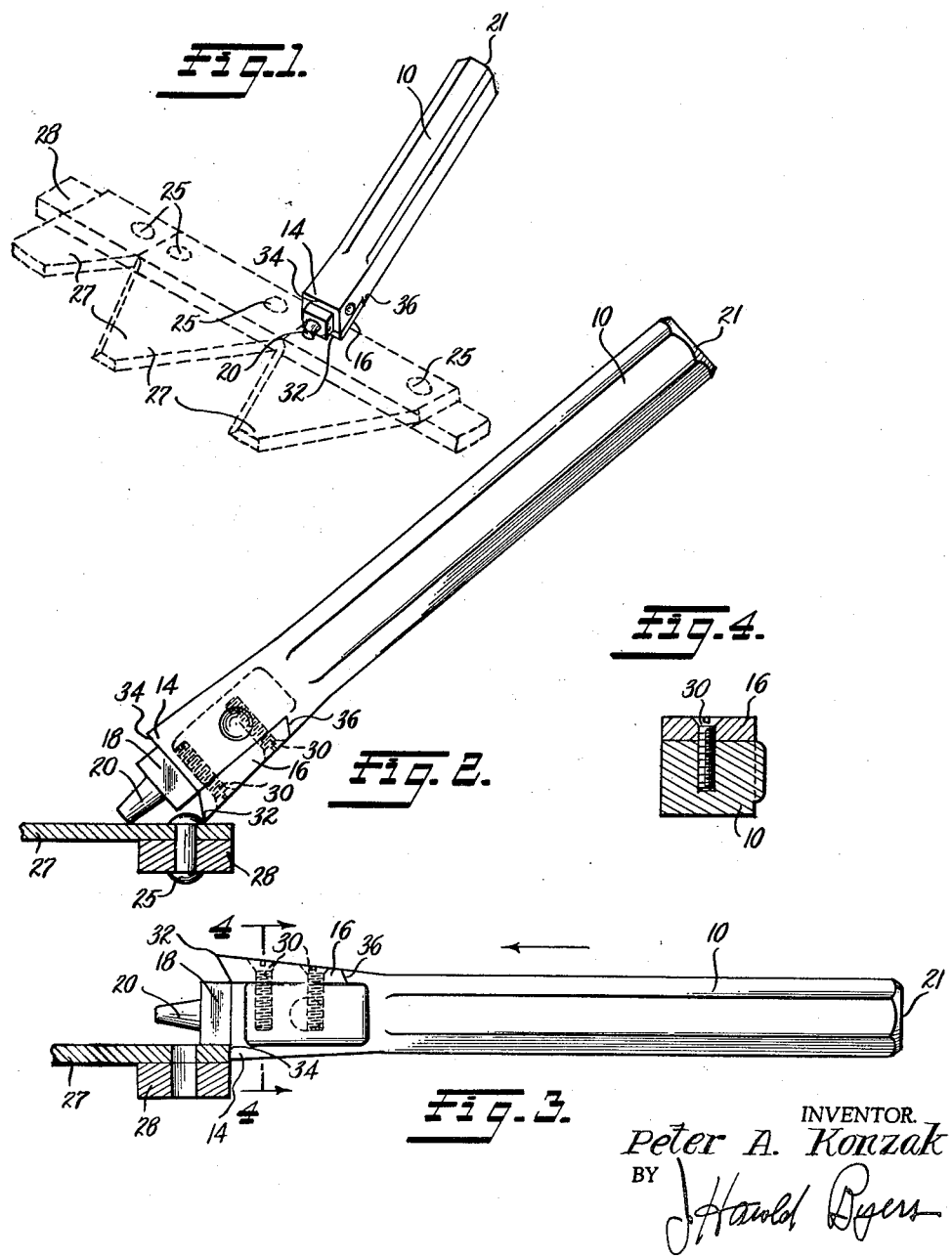

3,182,396
DEVICE FOR REPAIRING THE CUTTER BARS OF MOWERS AND OTHER TYPES OF AGRICULTURAL MACHINERY
Peter A. Konzak, Brinsmade, N. Dak.
Filed Apr. 19, 1963, Ser. No. 274,256
2 Claims. (Cl. 30—168)

The present invention relates to a device for repairing the cutter bars of mowers and other types of agricultural machinery and is particularly directed to a tool for removing sections therefrom.

This application is a continuation-in-part of applicant's prior application Serial No. 23,516, filed April 20, 1960, now abandoned.

In the normal use of mowers, binders, combines and the like, damage to the sections occurs as the result of encounters with pebbles and other hard objects and from the attrition due to ordinary wear. It is common practice to repair machinery of this type by removing the old and worn or damaged section elements, and replacing them with new section elements. In this, the equipment is taken from the field to a repair shed and there the repairs are effected with the available hand tools.

It is an object of the present invention to provide a hand tool which may be readily carried and which may be used in the field to repair damaged or worn mower blades or the like.

It is a further object of the present invention to provide a means for making repairs of this type which can be effectively and conveniently used by one person.

It is a further object of the present invention to provide a novel tool composed of combinations of elements respectively cooperating in such a way as to facilitate: (1) the cutting off of the old rivet heads; and (2) the unseating or dislodging of the sections from the cutter bars whereon they may have become set by rusting and corrosion.

The device according to the present invention may be formed in one piece or it may be formed in such a way that the tool itself may be repaired by replacement of old cutting edge with a new blade. By providing for removability of the cutting edge, the cutter element may be the more readily sharpened and then reinserted for further use in the tool. The tool generally consists of a shank portion having dimensions that render it convenient for grasping and for the receipt of hammer blows. The shank of the tool may be round, octagonal, or any other desired shape. The head of the tool may be provided with a hardened portion if desired, but this is not essential according to the present invention.

A characteristic feature of the present invention is the provision at a location intermediate the ends of the tool of outwardly extending elements. By outwardly extending is meant that the element juts radially from the axis of the shank so as to gain reach and access for operating on the rivet or section as will hereinafter further appear.

In the drawing

FIG. 1 shows the tool according to the present invention in an operative position.

FIG. 2 is a view in elevation showing the tool of FIG. 1 in more detail.

FIG. 3 is a view in elevation showing the tool of FIGS. 1 and 2 in a different operative position.

FIG. 4 is a cross section taken along line 4—4 of FIG. 3 showing a detail of the replaceable cutting element.

Referring now to FIGS. 1, 2, and 3, there is shown a tool having a shank portion 10 and provided midway of the ends thereof with an outwardly extending blunt portion 14 and a cutting element 16. Forward of the said operating tool element there is shown a guide element 18 having a forward extension 20. In FIG. 1 the bar of a mower blade is indicated by the reference numeral 28. On this bar there are arranged a series of sections 27—27 affixed by rivets 25—25. The tool is in position of use by the operator, the cutting edge of the tool being engaged with one of the rivets in order to sever the head thereof by hammer blows on the upper end 21 of the tool. The operation is shown in more detail in FIG. 2. Here the cutting edge 32 of the cutter 16 is in position, that is to say, is located at the line where the edge of the head of the rivet substantially coincides with the upper surface of section 27. The forward part 20 of guide element 18 at the same time is resting on the surface of section 27 in order to guide the tool and steady it to its operating position. It will be understood that the user of this tool places the edge 32 on the surface of the section 27 and then manually and without necessity for visual inspection, is enabled to advance, rotate, and otherwise manipulate the entire tool while resting on the surface of section 27, into favorable angular contact. In this, it will be seen by inspection of FIG. 2 that the plane defined by the tip of element 20, and the cutting edge 32 (FIG. 3) coincides substantially with the surface of section 27, when the tool is in operative position. So oriented, the tool by means of blows on the upper end 21 thereof will readily shear off the rivet head.

After removal of the rivet by punch means, the tool may be rotated about its axis through 180° and lowered to a position substantially parallel to the plane of the section 27 as shown in FIG. 3. In this position the blunt shoulder 14 may be brought into contact with the near edge of section 27 and one or more blows with the hammer on surface 21 will serve to dislodge the section 27, which usually will be found to be rusted or corroded to bar 28.

In the embodiment shown in the drawing the cutter element 16 is removably attached to shank 10 by means of set screws 30—30. By this arrangement the user is enabled to remove the element 16 for purposes of sharpening the edge 32 or for replacement with a new element. The rear edge of element 16 engages inset shoulder 36 in shank 10.

As particularly shown in FIG. 3 the blunt shoulder element 14 has been brought into engagement with the edge of section 27 for the entire area of the forward face 34 of shoulder 14. Guide element 18 and shoulder portion 14 together form a step having a face 34 which is of a height substantially equal to, but desirably not appreciably greater than, the thickness of section 27, in order to afford maximum engagement with section 27 without simultaneously contacting bar 28. In using the tool the operator is assisted by guide element 18, which as shown in the figure of drawing normally rests flat on the surface of section 27. It will be appreciated that this guide element in this case, as in FIG. 2, is of considerable assistance in the use of the tool in order to afford engagement thereof with maximum efficiency. Optionally, element 20 may be tapered sufficiently to act as a punch means for removing the rivet from its original position.

After removal of the section 27 a new section may readily be inserted in place of the old one and secured by means of new rivets in known manner.

While it is deemed preferable that the cutting element 16 be replaceable as shown, it will be understood that if desired same may be made integral with the shank. The blunt shoulder portion 14 likewise may be made removable, but it is preferable that it be integral with the shank of the tool.

Whereas in FIGS. 1 and 2 the tool is shown in a position approximating 45° from the plane of section element 27, guiding element 20 and the edge 32 thereby defining a plane substantially coincident with the surface of section 27, this being consequently approximately 45° in reference to the axial direction of the shank of the tool, it will be understood that the magnitude of 45° is merely exemplary, and that considerably greater or lesser angular orientation of the respective elements will not drastically change the operation thereof or depart from the underlying concept of the invention.

Having described a preferred embodiment of the invention, it will be understood that there are variations within the scope thereof, and what is desired to protect by Letters Patent is set forth in the subjoined claims:

1. A tool for shearing rivets from mower blades and the like comprising: a shank portion, a chisel blade offset from said shank portion, a guide element extending forward from said chisel blade, said guide element being substantially coaxial with said shank portion, the tip of said guide element and the edge of said chisel blade, defining a plane forming an angle to the axial direction of said shank portion.

2. A tool for shearing rivets from mower blades and the like comprising: a shank portion, a chisel blade offset from said shank portion, a guide element extending forward from said chisel blade, said guide element being substantially coaxial with said shank portion, the tip of said guide element and the edge of said chisel blade, defining a plane forming an angle to the axial direction of said shank portion, the tip of said guide element being blunt and rounded in cross section.

References Cited by the Examiner

UNITED STATES PATENTS

| | | | |
|---|---|---|---|
| 590,023 | 9/97 | Robinson | 29—275 |
| 695,672 | 3/02 | Diaz | 145—21 |
| 1,174,894 | 3/16 | Perkins | 30—168 |
| 1,864,405 | 6/32 | Brewer | 29—275 |

FOREIGN PATENTS 22,798 11/05 Great Britain.

WILLIAM FELDMAN, *Primary Examiner.*